United States Patent [19]

Boultinghouse

[11] Patent Number: 4,663,212

[45] Date of Patent: May 5, 1987

[54] RESINOUS POLYMER PRINTING

[75] Inventor: Harold D. Boultinghouse, Bartlesville, Okla.

[73] Assignee: Phillips Petroleum Company, Bartlesville, Okla.

[21] Appl. No.: 770,487

[22] Filed: Aug. 29, 1985

[51] Int. Cl.$^4$ .................. B32B 3/14; B32B 27/14; B41M 1/30

[52] U.S. Cl. ........................... 428/195; 101/2; 101/17; 101/466; 106/20; 106/30; 106/31; 427/261; 428/207; 428/327; 428/484; 428/488.1

[58] Field of Search ............... 428/195, 207, 407, 141, 428/327, 484, 488.1; 430/112, 306; 427/17, 322, 261; 101/2, 17, 466; 106/20, 30, 31

[56] References Cited

U.S. PATENT DOCUMENTS

| | | | |
|---|---|---|---|
| 3,563,782 | 2/1971 | Liberman et al. | 428/141 |
| 3,918,966 | 11/1975 | Metcalfe et al. | 430/112 X |
| 3,948,828 | 4/1976 | Becker et al. | 428/407 |
| 3,962,498 | 6/1976 | Owston | 427/322 |
| 4,028,165 | 6/1977 | Rosenfield | 428/207 X |
| 4,400,460 | 8/1983 | Fickes et al. | 430/306 |

OTHER PUBLICATIONS

Technical Bulletin Shell Chemical Co., "Pentoxone Solvent", 8/1984, pp. 1–7.
Pentoxone Technical Bulletin, Shell Chemical Co. (1984).

*Primary Examiner*—Thomas J. Herbert
*Attorney, Agent, or Firm*—Mark A. Montgomery

[57] ABSTRACT

Inks containing at least one keto-ether, such as 4-meth-4-methyl-2-pentanone, are able to print on resinous block copolymers, such as butadiene/styrene block copolymer, having an anti-blocking agent incorporated therein, such as a micro crystalline wax.

17 Claims, No Drawings

RESINOUS POLYMER PRINTING

BACKGROUND OF THE INVENTION

This invention relates to printing resinous block copolymers. More particularly, this invention relates to printing antiblocking resinous block copolymers containing antiblocking agent.

Many plastic materials exhibit surface characteristics such that printing inks, labels, and the like, do not adhere satisfactorily to the surface of the plastic. In many instances it is possible to improve the adherence characteristics of the substrate by subjecting same to an oxidative print treatment technique utilizing a flame, and corona discharge, an oxidizing acid, or the like. One new class of polymers, resinous block copolymers, is becoming of increasing significance. In many instances these polymers require an antiblocking agent to prevent surfaces thereof from sticking together. One such antiblocking agent is microcrystalline wax as disclosed in U.S. Pat. No. 3,766,114, the disclosure of which is incorporated herein by reference. With such polymers conventional print treatment techniques are not entirely satisfactory because of the presence of the antiblock agent which not only prevents the surface of the polymer from sticking together but also prevents the adherence of printing inks, labels, and the like, even after a standard print treatment.

When standard inks are used to print on resinous block copolymers that contain an antiblocking agent the printed article will not dry well. When the antiblocking agent is microcrystalline wax the standard solvents in the ink soften the wax leaving the surface sticky and unable to dry.

Different methods have been used to render these resinous block copolymers printable. For example, U.S. Pat. No. 3,896,068 and U.S. Pat. No. 4,009,295 disclose the incorporation of an olefin polymer into the resinous block copolymer to render it printable.

OBJECT OF THE INVENTION

It is an object of this invention to provide a composition and process to print resinous block copolymers; it is yet a further object of this invention to provide a permanently printed resinous block copolymer which has good blocking characteristics; and it still yet a further object of this invention to avoid the deleterious effect on printability caused by antiblocking agents.

DESCRIPTION OF THE INVENTION

In accordance with this invention a resinous copolymer containing an antiblock agent is printed with an ink containing at least one keto-ether and/or hydroxyl-ether.

In accordance with a specific aspect of this invention, a resinous block copolymer having an antiblock agent therein is printed with an ink containing at least one keto-ether and/or hydroxyl-ether.

DETAILED DESCRIPTION OF THE INVENTION

The resinous block copolymer can be any resinous block copolymer of a conjugated diene and a monovinyl-substituted aromatic compound.

Suitable conjugated dienes or mixtures thereof that can be employed includes those having 4–12 carbon atoms per molecule, those containing 4–8 carbon atoms being preferred. Exemplary of suitable compounds are 1,3-butadiene, isoprene, 2,3-dimethyl-1,3-butadiene, piperylene, 3-butyl-1,3-octadiene, 2-phenyl-1,3-butadiene, and the like, and mixtures thereof, 1,3-butadiene being particularly preferred.

The monovinyl-substituted aromatic compounds are those containing 8–18 carbon atoms per molecule. Examples of suitable compounds include styrene, 3-methylstyrene, 4-n-propylstyrene, 4-cyclohexylstyrene, 4-decylstyrene, 2-ethyl-4-benzylstyrene, 4-p-tolylstyrene, 4-(4-phenyl-n-butyl)styrene, 1-vinylnaphthalene, 2-vinylnaphthalene, and the like, styrene being preferred.

The polymers can be of either an A-B configuration, an A-B-A configuration, or a coupled radial (AB)-(BA)$_n$ configuration where n is 2 or more, preferably 2 or 3. The coupling agent is disregarded in the last formula since it is so small compared with the length of the polymer chains. This latter formula can also be expressed X(BA)$_n$ where X is the coupling agent and n is greater than 2. The A is the resinous monovinyl-substituted aromatic compound block which can optionally have incorporated therein a small amount of a comonomer. The B is a rubbery diene block which optionally can have same comonomer incorporated therein, the B blocks being insufficient to cause the totalblock copolymer to be rubber.

By resinous is meant a normally solid material not having rubber properties. Generally such materials will have a Shore D hardness (ASTM D2240-75) of greater than 62, preferably greater than 69.

The preferred polymers are radial polymers, the preparation of which is broadly disclosed in Zelinski et al, U.S. Pat. No. 3,281,383 issued Oct. 25, 1966, the disclosure of which is hereby incorporated by reference, it being understood that the radial block copolymers of this invention are limited to those having resinous characteristics. Resinous block copolymers having branches of polymer which demonstrate a plurality of modes on a gel permeation chromatograph curve prior to coupling are disclosed in Kitchen et al., U.S. Pat. No. 3,639,517, issued Feb. 1, 1972, and Kitchen, U.S. Pat. No. 4,091,053, issued May 23, 1978, the disclosures of which are hereby incorporated by reference, are especially preferred.

Briefly the preferred resinous radial block polymers to which this invention applies can be prepared by producing a block of monovinyl-substituted aromatic compound in the presence of an organolithium initiator to give a block containing an active lithium atom on one end of the polymer chain. This living chain is then reacted with the conjugated diene monomer to give a block copolymer chain with an active lithium atom at one end thereof. This lithium-terminated copolymer is then reacted with a compound which has at least three reactive sites capable of reacting with the lithium-carbon bond and adding to the carbon possessing this bond in the polymer. The result is a polymer having relatively long branches which radiate from the nucleus formed by the polyfunctional compound reacted with the lithium-terminated polymer.

The anti-block agent which is present in the polymer can be any conventional antiblock agent used in the art including microcrystalline waxes, stearates such as sodium stearate, alkyl amines, stearamides, and the like. Most preferred are microcrystalline paraffin waxes having a melting point in the range of 180°–200° F. Such materials are sold by Bareco Division, Petrolite Corporation. The antiblock agent can be present in an amount within the range of about 0.1 to about 20 weight percent based on the weight of the polymer although generally lower concentrations are used particularly where it is desired to have a final product which is clear. Preferred concentrations are in the range of 0.1 to 0.5 weight percent based on the weight of block copolymer. In accordance with this preferred embodiment samples having a haze of less than about 4.5–6 percent preferably less than about 2.5–4 percent (ASTM D1003-61 using Gardner Hazemeter) can be produced, the haze being determined on 100 mil thick injection molded specimens.

Any dye or pigment article with or without additional solvent can be used in combination with the keto-ether and/or hydroxyl-ether (hereinafter ether) so long as they are compatible. Any ink (pigment and solvent) intended for printing is preferred. Inks intended for use with resinous butadiene styrene copolymer being the most preferred so long as they are compatible with the ether. Incompatibility is evidenced by precipitation of any ingredient(s) or drastic changes in the viscosity of the ink formulation.

When an ether is used as the only solvent in combination with a pigment the concentrations depend upon how dark of print is desired. It is envisioned that a minute amount of pigment in combination with a large amount of ketoether could be used if a light print is desired.

When ink (pigment and solvent) is used the amount of ether can be up to about 25 percent of the ink formulation. Generally, the ether will be in the range of about 0.1 to about 10 volume percent of the ink formulation, preferably 3–5 volume percent.

The keto-ether is thoroughly mixed with the ink or pigment by any known mixing procedure and the modified formulation is then ready to be used in the usual fashion of application and curing of the ink.

The substrate can be given a surface treatment of any type conventionally known in the art, such as flame treatment, acid treatment, or corona discharge etc. for producing a printable surface.

Any hydroxyl-ether and/or keto-ether and mixtures thereof are considered useful for this invention. More particularly hydroxyl-ethers and keto-ethers of the formula:

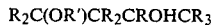

$R_2C(OR')CR_2CROHCR_3$ and

$R_2C(OR')CR_2COCR_2$ respectively, wherein R is hydrogen or an alkyl group having from 1–5 carbon atoms wherein each R can be the same or different and wherein R' is an alkyl group having from 1–5 carbon atoms. The more preferred formulas are:

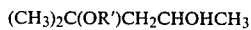

$(CH_3)_2C(OR')CH_2CHOHCH_3$ and

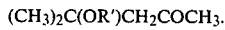

$(CH_3)_2C(OR')CH_2COCH_3$.

Examples of hydroxyl-ethers include 4-ethoxy-4-methyl-2-pentanol; 4-propoxy-4-methyl-2-pentanol and 2-methoxy-4-hexanol, 4-methoxy-4-methyl-2-pentanol being preferred.

The keto-ethers are preferred. Examples of keto-ethers include 4-ethoxy-4-methyl-2-pentanone; 4-propoxy-4-methyl-2-pentanone; and 2-methoxy-4-hexanone, 4-methoxy-4-methyl-2-pentanone being the most preferred.

The compound 4-methoxy-4-methyl-2-pentanone can be made by the reaction of anhydrous methanol with 2-methyl-2-pentene-4-one (commonly known as mesityl oxide) in the presence of a strongly basic ion exchange resin (Belgium Patent 631,124). This compound was previously available from Shell Oil Company as PENT-O-XONE ® solvent.

EXAMPLE

A small amount of PENT-O-XONE ® (4-methoxy-4-methyl-2-pentanone) was added to Sinclair and Volcantings GAC-301 Red ink and without prior washing or treating was printed directly on a microcrystalline wax containing butadiene styrene block copolymer (prepared as in U.S. Pat. No. 3,766,114). The ink dried hard and had very good adhesion.

This shows that an ink containing an ether of the present invention can be permanently printed on a normally non-printable resinous block copolymer antiblock substrate.

That which is claimed is:

1. An article comprising a substrate made of a resinous block copolymer of a conjugated diene/monovinyl-substituted aromatic containing from about 0.1 to about 20 weight percent based on the weight of said block copolymer of an antiblock microcrystalline wax having an ink printed on the surface of said substrate that is made of pigment particles and an amount of 4-methoxy-4-methyl-2-pentanone sufficient to allow the ink to print on the surface of said substrate.

2. A process for printing resins comprising; applying to a surface of a substrate made of a resinous block copolymer, containing about 0.1 to about 20 weight percent based on the weight of said block copolymer of a microcrystalline wax antiblock agent, a printing ink made of dye particles and at least about 0.1 volume percent of at least one ether selected from the group consisting of keto-ethers and hydroxyl-ethers.

3. A process for printing according to claim 2 wherein the ether is a keto-ether and is of the formula:

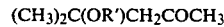

$(CH_3)_2C(OR')CH_2COCH_3$ where R is a hydrocarbyl radical of 1–5 carbon atoms.

4. A process for printing according to claim 3 wherein said resinous block copolymer is a resinous conjugated diene/monovinyl-substituted aromatic block copolymer and wherein the conjugated diene and the monovinyl-substituted aromatic of said resinous block copolymer have 4 to 12 carbon atoms and 8 to 18 carbon atoms respectively.

5. A process for printing according to claim 3 wherein the resinous conjugated diene/monovinyl-substituted aromatic block copolymer is resinous butadiene/styrene block copolymer.

6. An article made according to the process of claim 4 wherein said resinous block copolymer consists essentially of resinous butadien/styrene block copolymer and microcrystalline wax antiblock agent.

7. A process for printing according to claim 2 wherein the hydroxyl-ether is of the formula:

$(CH_3)_2C(OR')CH_2CHOHCH_3$ .

where R is a hydrocarbyl radical of 1-5 carbon atoms.

8. A process for printing according to claim 7 wherein said resinous block copolymer is a resinous conjugated diene/monovinyl-substituted aromatic block copolymer and wherein the conjugated diene, and the monovinyl-substituted aromatic of said resinous block copolymer have 4 to 12 carbon atoms and 8 to 18 carbon atoms respectively.

9. A process according to claim 8 wherein the conjugated diene/monovinyl-substituted aromatic block copolymer is resinous butadiene/styrene block copolymer.

10. A process according to claim 2 wherein said hydroxyl-ethers and keto-ethers are of the formula:

$R_2C(OR')CR_2CROHCR_3$ and $R_2C(OR')CR_2COCR_3$ respectively, wherein R is hydrogen or an alkyl group having 1 to 5 carbon atoms, each R can the same or different, and R' is an alkyl group having 1 to 5 carbon atoms.

11. A process according to claim 10 wherein said hydroxyl-ethers and keto-ethers are selected from the group consisting of 4-ethoxy-4-methyl-2-pentanol, 4-propoxy-4-methyl-2-pentanol, 2-methoxy-4-hexanol, 4-methoxy-4-methyl-2-pentanol, 4-ethoxy-4-methyl-2-pentanone, 4-propoxy-4-methyl-2-pentanone, 2-methoxy-4-hexanone, and 4-methoxy-4-methyl-2-pentanone.

12. A process for printing resins comprising forming a substrate made of a resinous block copolymer of a conjugated diene/monovinyl-substituted aromatic containing about 0.1 to about 20 weight percent based on the weight of said block copolymer of an antiblock microcrystalline wax, thereafter applying to the surface of said substrate a printing ink made of pigment particles and an amount of 4-methoxy-4-methyl-2-pentanone sufficient to render said ink printable on said block copolymer.

13. A printing process according to claim 12 wherein said ink also contains an additional solvent and said 4-methoxy-4-methyl-2-pentanone is in the range of about 0.1 to about 10 volume percent based on the ink formulation.

14. A printing process according to claim 13 wherein said 4-methoxy-4-methyl-2-pentanone is in the range of about 3 to about 5 volume percent based on the ink formulation and said resinous block copolymer is resinous butadiene/styrene block copolymer.

15. A process for printing resinous block copolymers comprising:
(a) forming a substrate made of a conjugated diene/monovinyl-substituted aromatic block copolymer containing about 0.1 to about 20 weight percent based on the weight of said block copolymer of an antiblock microcrystalline wax, thereafter,
(b) applying to the surface of the substrate of said step (a) an ink containing solvent, pigment particles, and 4-methoxy-4-methyl-2-pentanol in the range of about 0.1 to about 10 volume percent based on the ink formulation.

16. A composition comprising a resinous block copolymer of a conjugated diene/monovinyl-substituted aromatic containing from about 0.1 to about 20 weight percent based on the total weight of said block copolymer of an antiblock microcrystalline wax and a printing ink made of pigment particles and an amount of 4-methoxy-4-methyl-2-pentanone sufficient to allow the ink to penetrate the block copolymer.

17. A composition according to claim 16 wherein said resinous block copolymer is resinous butadiene/styrene block copolymer.

* * * * *